(12) United States Patent
Cheng (10) Patent No.: US 9,250,647 B2
(45) Date of Patent: Feb. 2, 2016

(54) DISPLAY SCREEN APPARATUS, TOUCH SCREEN ASSEMBLY, AND METHOD FOR MAKING A DISPLAY SCREEN APPARATUS

(71) Applicant: Innolux Corporation, Miao-Li County (TW)

(72) Inventor: Wei-Yuan Cheng, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 299 days.

(21) Appl. No.: 13/759,096

(22) Filed: Feb. 5, 2013

(65) Prior Publication Data

US 2013/0215052 A1 Aug. 22, 2013

(30) Foreign Application Priority Data

Feb. 17, 2012 (TW) .............................. 101105276 A (51) Int. Cl.
*C09K 19/00* (2006.01)
*G06F 1/16* (2006.01)
*G02B 27/00* (2006.01)
*G06F 3/041* (2006.01)
*G02B 5/00* (2006.01)

(52) U.S. Cl.
CPC *G06F 1/16* (2013.01); *G02B 5/003* (2013.01); *G02B 27/00* (2013.01); *G06F 1/1601* (2013.01); *G06F 3/0412* (2013.01); *G02B 2207/107* (2013.01); *Y10T 428/10* (2015.01); *Y10T 428/1086* (2015.01); *Y10T 428/24496* (2015.01); *Y10T 428/24777* (2015.01)

(58) Field of Classification Search
CPC ....... G06F 1/16; G06F 1/1601; G06F 3/0412; G06F 3/041; G06F 2203/107; G02B 27/00; G02B 2207/107; G02B 5/003; Y10T 428/4913; Y10T 428/24777; Y10T 428/24496; Y10T 428/10; Y10T 428/1086; Y10T 428/1073
USPC .......... 428/1.1, 1.5, 1.53, 1.55, 1.6, 158, 192; 345/173; 359/601; 430/319
See application file for complete search history.

(56) References Cited

U.S. PATENT DOCUMENTS 6,501,527 B1 * 12/2002 Hirose et al. ................... 349/155
2007/0091246 A1 * 4/2007 Sugimoto ..................... 349/153

* cited by examiner

*Primary Examiner* — Ruiyun Zhang
(74) *Attorney, Agent, or Firm* — McClure, Qualey & Rodack, LLP (57) ABSTRACT

A display screen apparatus having a viewing region and a peripheral region surrounding the viewing region includes: a light transmissive substrate having inner and outer surfaces; and a light cured material layer disposed on the inner surface of the light transmissive substrate and having a peripheral portion corresponding in position to the peripheral region of the display screen apparatus. The peripheral portion is formed with a plurality of pores therein.

13 Claims, 7 Drawing Sheets

DISPLAY SCREEN APPARATUS, TOUCH SCREEN ASSEMBLY, AND METHOD FOR MAKING A DISPLAY SCREEN APPARATUS

CROSS-REFERENCE TO RELATED APPLICATION

This application claims priority of Taiwanese application no. 101105276, filed on Feb. 17, 2012.

BACKGROUND OF THE INVENTION

1. Field of the Invention

The invention relates to a display screen apparatus, a touch screen assembly and a method for making the display screen apparatus.

2. Description of the Related Art

In order to create a framing effect, conventional display screens normally have an opaque frame layer formed on a peripheral region thereof. Conventionally, formation of the frame layer is conducted by screen printing with an ink material. However, the frame layer thus formed has a relatively high surface roughness (on the order of microns), which has an adverse effect (such as an increase in resistance) on transparent conductive lines of a touch sensing circuit that is formed on a surface of the frame layer and a surface of the display screen. Conventionally, the color of the frame layer can be black or white depending on the color of the ink material that is used. The white ink material normally includes a thermoset resin and a dye powder, such as titanium dioxide and barium sulfate, dispersed in the thermoset resin. Unlike the black ink material, the white ink material still has a low light transmissibility. Hence, a thicker layer thickness is required for the white ink material to form a completely opaque frame layer as compared to the black ink material. As a consequence, a higher height difference (about 15-20 μm) between a surface of the frame layer and a surface of the display screen is created for the white ink material, which tends to cause breaking of the transparent conductive lines at an interface between the surface of the frame layer and the surface of the display screen. In addition, the frame layer formed by screen printing techniques has a poor linearity at an edge of the frame layer. Moreover, the thermoset resin requires a longer curing time.

SUMMARY OF THE INVENTION

Therefore, an object of the present invention is to provide a display screen apparatus that can overcome the aforesaid drawbacks associated with the prior art.

Another object of the present invention is to provide a touch screen assembly including the display screen apparatus.

Yet another object of the present invention is to provide a method for making the display screen apparatus.

According to one aspect of the present invention, there is provided a display screen apparatus having a viewing region and a peripheral region surrounding the viewing region. The display screen apparatus comprises: a light transmissive substrate having inner and outer surfaces; and a light cured material layer disposed on the inner surface of the light transmissive substrate and having a peripheral portion corresponding in position to the peripheral region of the display screen apparatus. The peripheral portion is formed with a plurality of pores therein.

According to another aspect of the present invention, there is provided a method for making a display screen apparatus. The method comprises: (a) forming a light curable material layer containing a solvent on a viewing area and a peripheral area of an inner surface of a light transmissive substrate, the peripheral area extending from and surrounding the viewing area; (b) passing a light through a photomask so that a portion of the light curable material layer that is disposed on the peripheral area is irradiated by the light and is converted into a light cured material layer; and (c) removing the solvent in the light cured material layer on the peripheral area and the solvent in the remaining portion of the light curable material layer on the viewing area so as to form a plurality of pores in the light cured material layer.

According to yet another aspect of the present invention, there is provided a touch screen assembly that comprises: the display screen apparatus as defined above and having an inner side; a touch sensing unit disposed on the inner side of the display screen apparatus and having an inner side; and a display panel disposed on the inner side of the touch sensing unit.

BRIEF DESCRIPTION OF THE DRAWINGS

In drawings which illustrate an embodiment of the invention.

DETAILED DESCRIPTION OF THE PREFERRED EMBODIMENT

Figure 2:
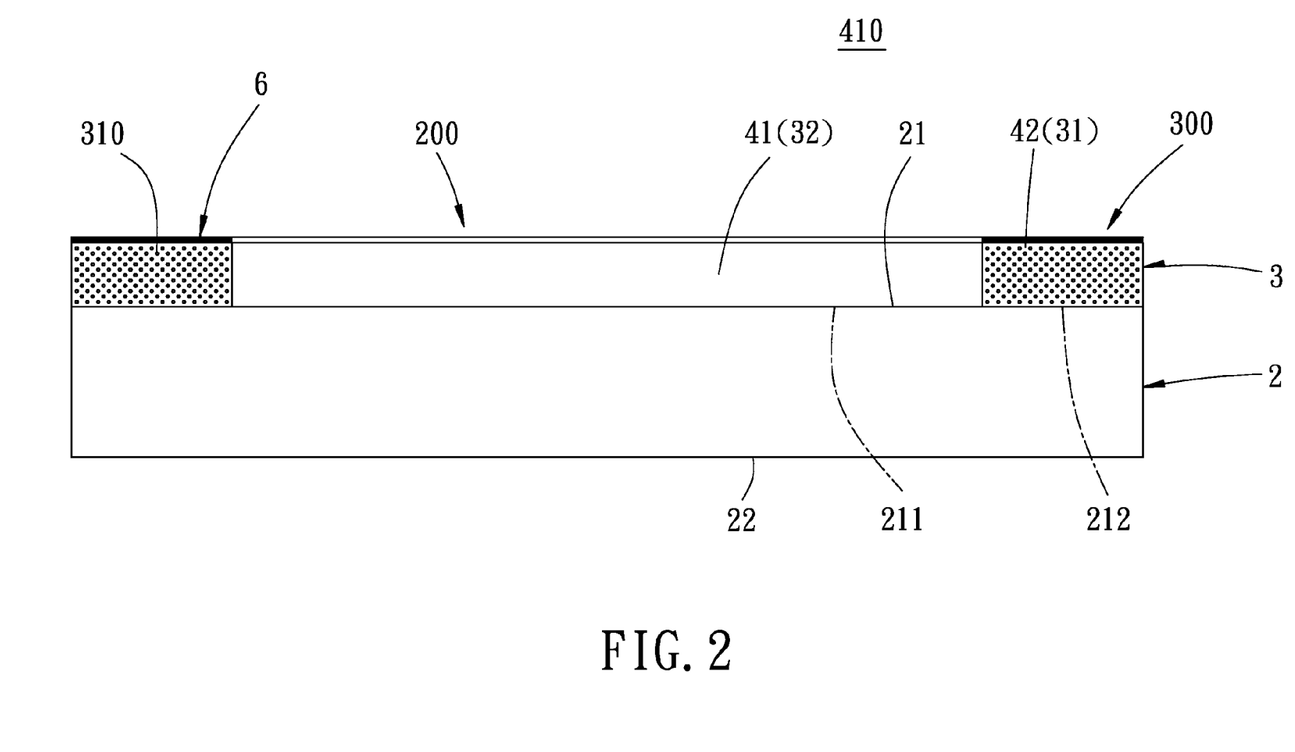
FIG. 2 is a schematic view of the preferred embodiment of the display screen apparatus according to the present invention.
Figure 3:
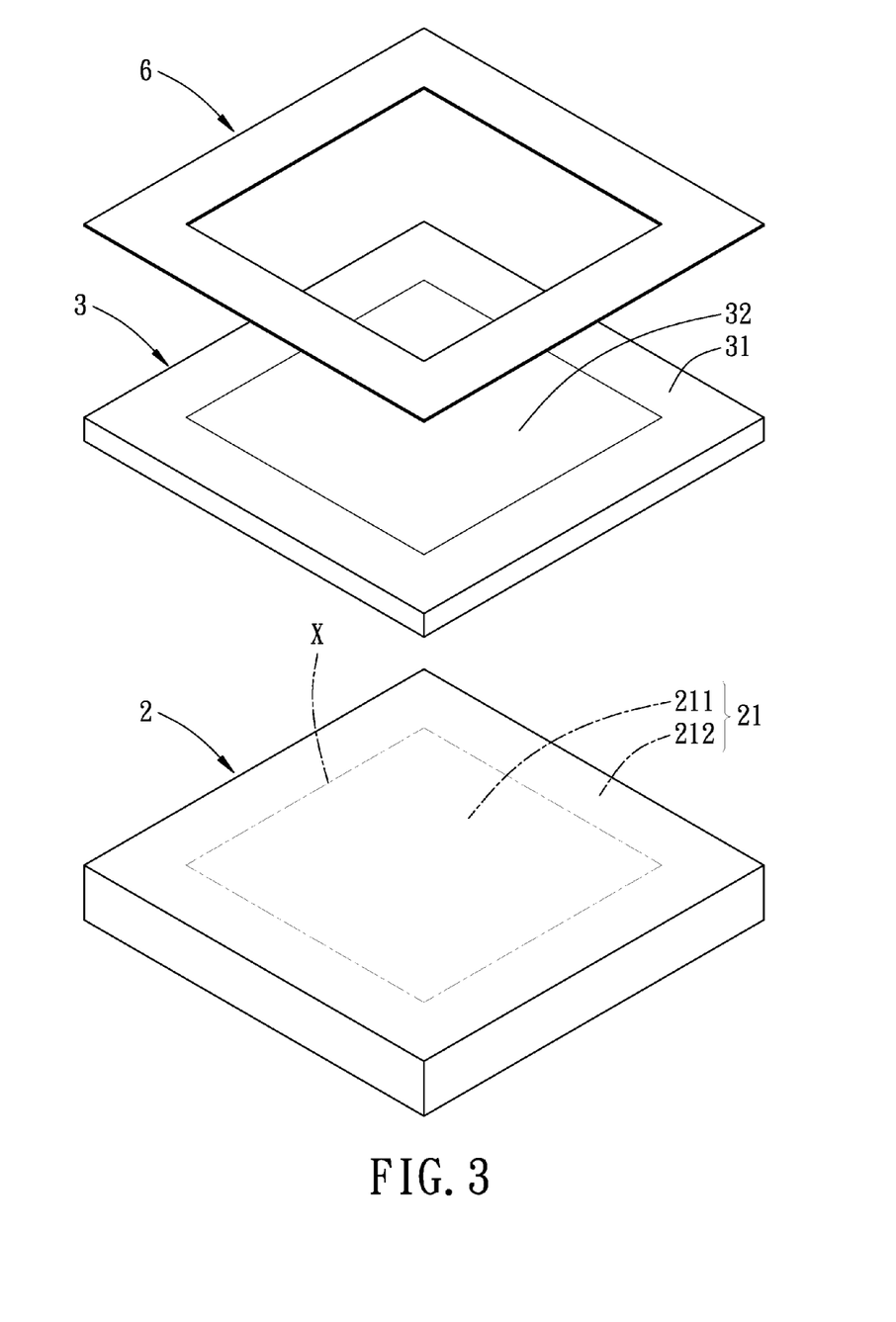
FIG. 3 is an exploded perspective view of the preferred embodiment.

FIGS. 2 and 3 illustrate the preferred embodiment of a display screen apparatus 410 according to the present invention. The display screen apparatus 410 includes: a viewing region 200; a peripheral region 300 surrounding the viewing region 200; a light transmissive substrate 2 having inner and outer surfaces 21, 22, the inner surface 21 having a viewing area 211 corresponding to the viewing region 200 and a peripheral area 212 extending from and surrounding the viewing area 211 and corresponding to the peripheral region 300 (the viewing area 211 and the peripheral area 212 are divided by an imaginary rectangle (X) drawn in accordance with a desired width of the peripheral region 300 to be formed); a light cured material layer 3 disposed on the inner surface 21 of the light transmissive substrate 2 and having a peripheral portion 31 that corresponds in position to the peripheral region 300 of the display screen apparatus 410 and a middle portion 32 that corresponds to the viewing region 200, that is light transmissive and that extends from and that is surrounded by the peripheral portion 31, the peripheral portion 31 being formed on the peripheral area 212 of the inner surface and being formed with a plurality of pores 310 therein, the pores 310 having a pore diameter capable of rendering the peripheral portion 31 to exhibit light scattering and whitening effects; and a reflective layer 6 formed on the peripheral portion 31.

In this embodiment, due to the scattering and whitening effects of the pores 310, the assembly of the peripheral portion 31 of the light cured material layer 3 and the light transmissive substrate 2 has a white color and an optical density greater than 2 when measured at the peripheral region 300. The peripheral portion 31 of the light cured material layer 3 preferably has a layer thickness ranging from 1 μm-50 μm. The pores 310 preferably have a pore diameter ranging from 10-1000 nm. The light transmissive substrate 2 is preferably made from glass. The middle portion 32 of the light cured material layer 3 preferably has a layer thickness ranging from 1-50 μm and a light transmissibility greater than 90%. Due to the presence of the pores 310 in the peripheral portion 31 of the light cured material layer 3, the layer thickness of the peripheral portion 31 is greater than that of the middle portion 32 by about 5-20% based on the layer thickness of the middle portion 32.

Preferably, the reflective layer 6 has a reflectivity greater than 60%, and is made from a metallic material selected from Al, Ag, Mo, and combinations thereof. Preferably, the reflective layer 6 has a layer thickness less than 1 μm, and the assembly of the reflective layer 6, the peripheral portion 31 of the light cured material layer 3 and the light transmissive substrate 2 has an optical density greater than 4 and a coordinate value (L, a, b) in the Lab color space, in which L>25, −1<a<1 and −1<b<1, when measured at the peripheral region 300.

The light cured material layer 3 is made from a light curable material, such as a UV light curable material. The light curable material includes a light curable monomer or oligomer, a photo initiator, a solvent and auxiliary agents.

Preferably, examples of the light curable monomer include, but are not limited to, 1,6-hexanediol diacrylate (HDDA), trimethylolpropane triacrylate (TMPTA), dipropylene glycol diacrylate (DPGDA), tripropylene glycol diacrylate (TPGDA), methyl acrylate, ethyl acrylate, butyl acrylate, 2-ethylhexyl acrylate, 2-hydroxyethyl acrylate, isobornyl acrylate, methyl methacrylate, isobornyl methacrylate (IBMA), hydroxyethylmethacrylate (HEMA), ethyl methacrylate, silicone acrylate, acetonitrile, acrylonitrile, acrylamide, methacrylamide, N-substituted (meth) acrylamide, vinyl acetate, isobutyl vinyl ether, styrene, alkyl styrene, halogenated styrene, N-vinyl pyrrolidone, vinyl chloride, vinylidene chloride, ethylene glycol diacrylate, propylene glycol diacrylate, neopentyl glycol diacrylate, bisphenol A diacrylate, 4,4'-bis(2-acryloyloxyethoxy)diphenyl propane, pentaerythritol triacrylate, pentaerythritol tetraacrylate, vinyl acrylate, divinylbenzene, divinylsuccinate, diallylphthalate, triallyl phosphate, triallyl isocyanurate, and tris(2-acryloylethyl)isocyanurate.

Preferably, examples of the light curable oligomer include, but are not limited to, epoxy acrylate, polyurethane acrylate, polyester acrylate, polyacrylic acid acrylate, acrylated epoxy resin, acrylated polyester, vinyl ether or epoxy-containing polyester, polyurethane, polyether, and unsaturated polyester.

Preferably, examples of the photo initiator include, but are not limited to, oxime ester, phenyl ketone, onium salt, and phosphine oxide.

Preferably, the auxiliary additives include adhesion promoter, thixotropic agent, and In-can stabilizer.

Figure 4:
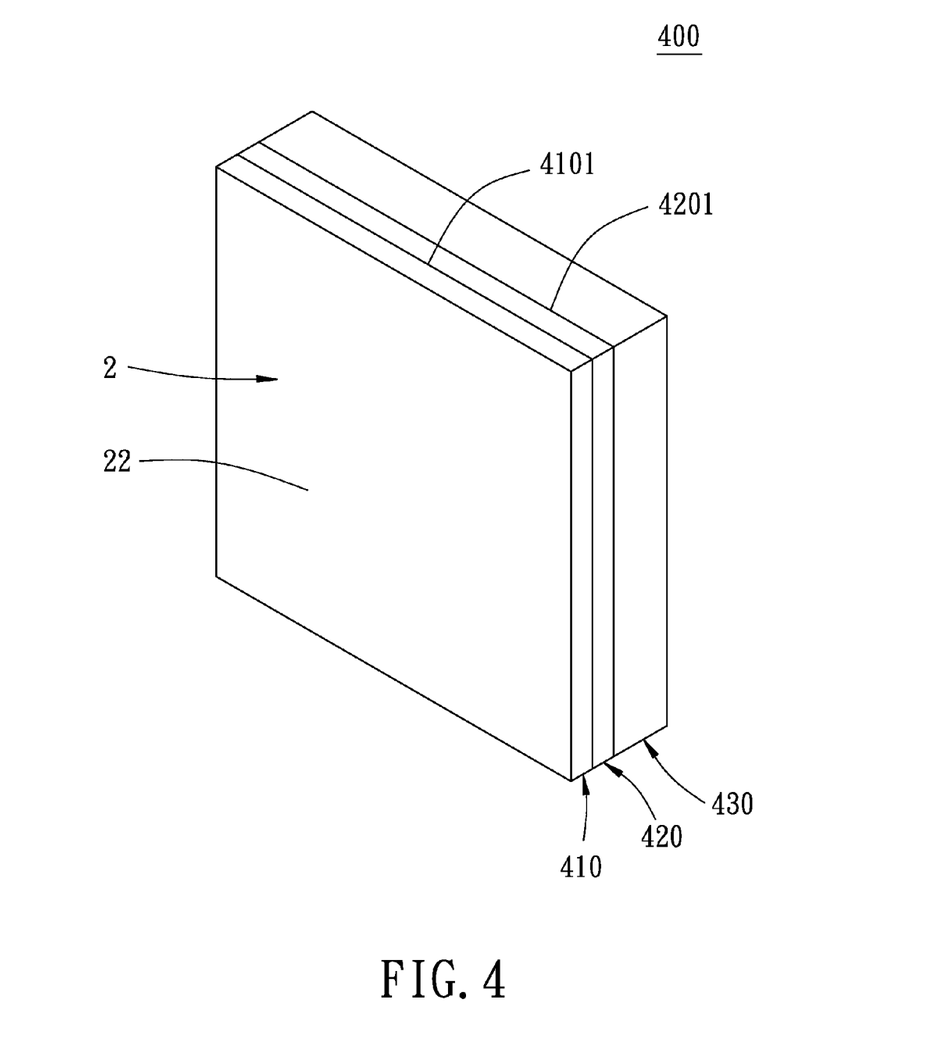
FIG. 4 is a perspective view of the preferred embodiment of a touch screen assembly according to the present invention.

FIG. 4 illustrates a touch screen assembly 400 that includes: the display screen apparatus 410 as described above and having an inner side 4101; a touch sensing unit 420 disposed on the inner side 4101 of the display screen apparatus 410 and having an inner side 4201; and a display panel 430 disposed on the inner side 4201 of the touch sensing unit 420. The touch sensing unit 420 can be directly formed on the display screen apparatus 410 or on a substrate that is subsequently assembled to the display screen apparatus 410. The display panel 430 can be an LCD display panel or an OLED display panel. The touch screen assembly 400 can be a mobile phone, a digital camera, PDA, a notebook computer, a desktop computer, a TV, a car use display, or a DVD player.

FIGS. 1A to 1E, in combination with FIG. 2, illustrate consecutive steps for making the display screen apparatus 410. The method includes the steps of: (a) forming a light curable material layer 41 containing a solvent on a viewing area 211 and a peripheral area 212 (see FIG. 1A) of an inner surface 21 of a light transmissive screen panel 2 (see FIG. 1B) in a conventional coating manner, the peripheral area 212 extending from and surrounding the viewing area 211, the light curable material layer 41 thus formed being clear and transparent and exhibiting a high light transmissibility; (b) passing a light through a photomask 5 so that a portion of the light curable material layer 41 that is disposed on the peripheral area 212 is irradiated by the light and is converted into a light cured material layer 42 (see FIG. 1C), the light cured material layer 42 still maintaining the high light transmissibility; and (c) removing the solvent in the light cured material layer 42 on the peripheral area 212 and the solvent in the remaining portion of the light curable material layer 41 on the viewing area 211 so as to form a plurality of pores 310 in the light cured material layer 42 (see FIG. 1D), thereby forming the peripheral portion 31 of the light cured material layer 3 shown in FIG. 2; (d) curing the light curable material layer 41 on the viewing area 211 by irradiation after step (c) (see FIG. 1E), thereby forming the middle portion 32 of the light cured material layer 3 shown in FIG. 2, by virtue of being free from being formed with the pores 310, the middle portion 32 thus formed still maintaining the high light transmissibility; and (e) forming a reflective layer 6 on the light cured material layer 42 on the peripheral area 212 after step (d).

Figure 1A:
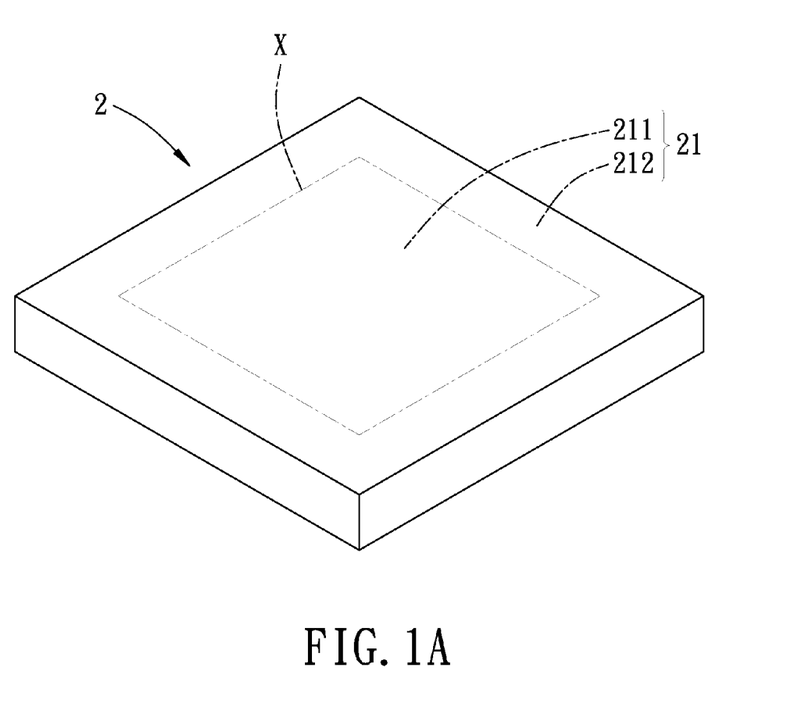
FIGS. 1A to 1E illustrate consecutive steps of a method for making the preferred embodiment of a display screen apparatus according to the present invention.
Figure 1B:
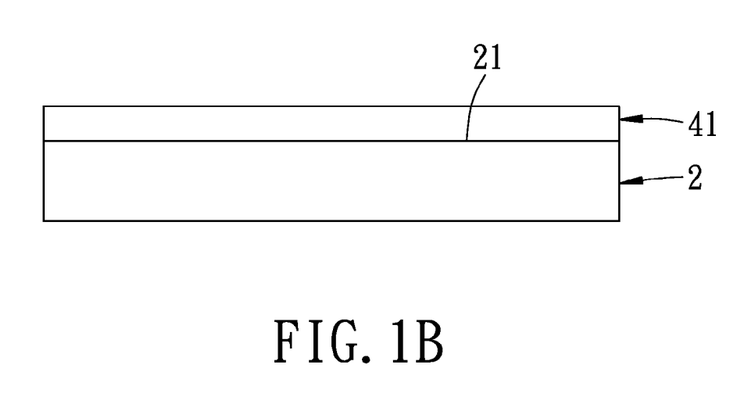
Figure 1C:
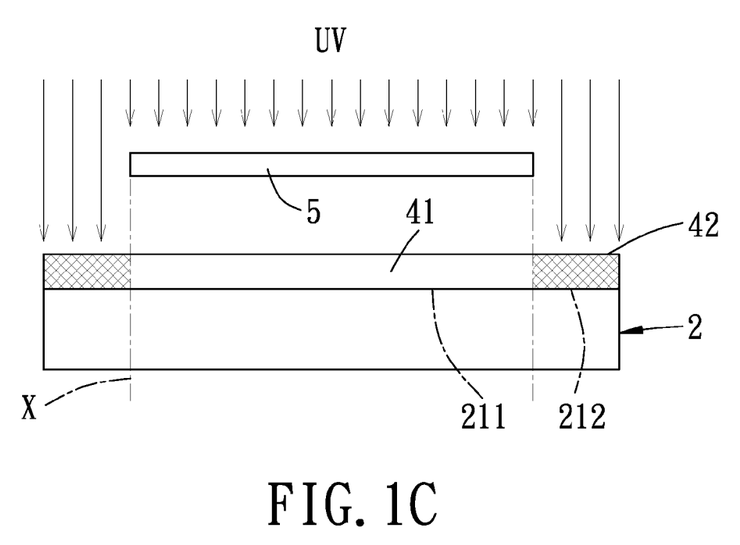

In this embodiment, the irradiation in step (b) is conducted at a dose ranging from 100-10,000 mJ/cm$^2$ for a period of time ranging from 10 seconds to 20 hours.

Figure 1D:
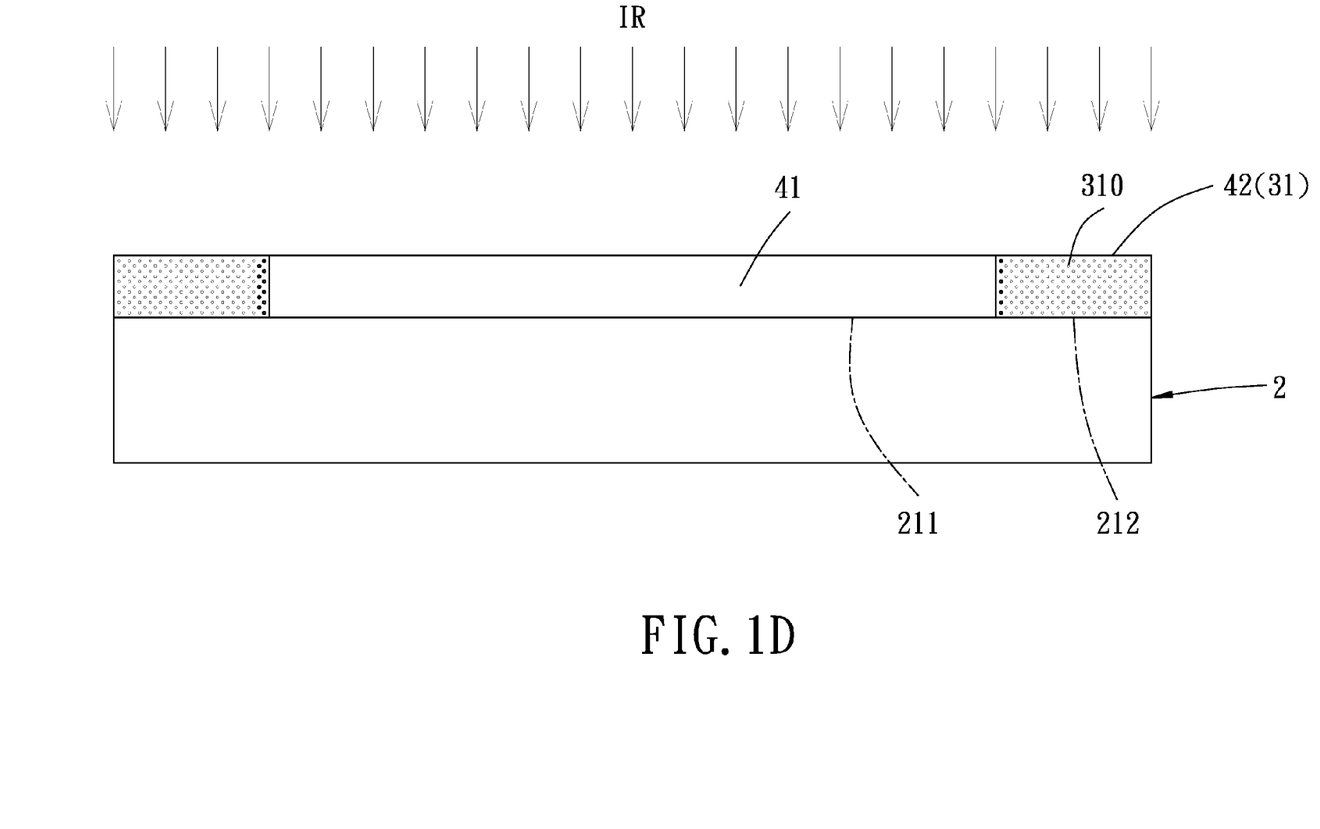
Figure 1E:
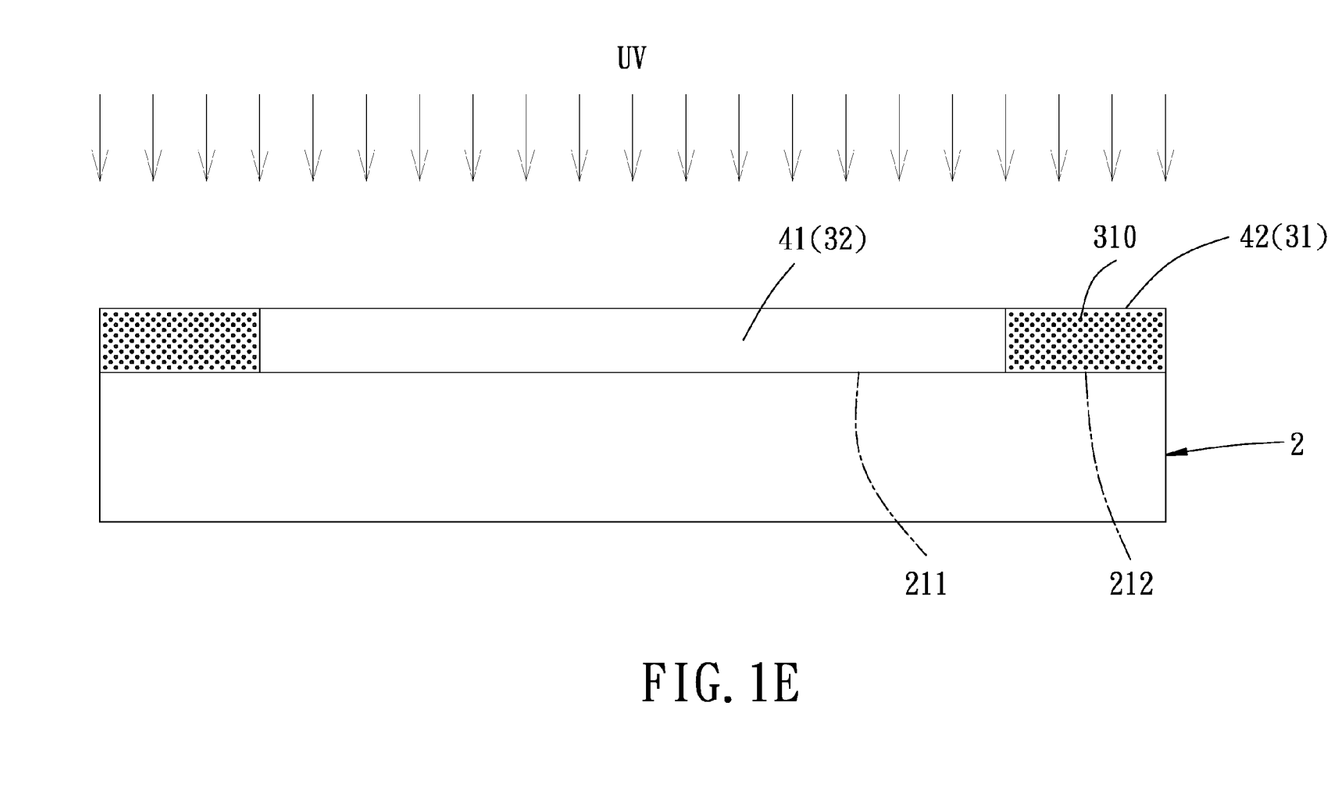

Preferably, removal of the solvent in step (c) is conducted by irradiating the light cured material layer 42 on the peripheral area 212 and the light curable material layer 41 on the viewing area 211 with an infrared light. The infrared light irradiation in step (c) is conducted at a temperature ranging from 50-200° C. for a period of time ranging from 1-30 minutes.

Compared to the aforementioned screen imprinted ink employed in the prior art, the light cured material layer 3 of the present invention exhibits a low surface roughness (on the order of nanometers and in a range of 10-100 nm). In addition, the layer thickness of the light cured material layer 3 can be relatively thin (in the range of 3-6 μm) while still achieving the desired property that the peripheral portion 31 of the light cured material layer 3 is opaque. Moreover, by using the irradiation techniques for curing the light curable material layer 41, edges of the peripheral portion 31 of the light cured material layer 3 can have a relatively high linearity.

Since the height difference between a top surface of the middle portion 32 and a top surface of the peripheral portion 31 of the light cured material layer 3 is substantially zero, the aforesaid drawback with respect to the breaking of the transparent conductive lines encountered in the prior art can be eliminated. Although the viewing area 211 of the inner surface 21 of the light transmissive substrate 2 is covered with the middle portion 32 of the light cured material layer 3, the assembly of the middle portion 32 of the light cured material layer 3 and the light transmissive substrate 2 (which has a light transmissibility of about 92%) still has a light transmissibility of about 91%.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A display screen apparatus having a viewing region and a peripheral region surrounding the viewing region, said display screen apparatus comprising:
   a light transmissive substrate having inner and outer surfaces; and
   a light cured material layer disposed on said inner surface of said light transmissive substrate and having a peripheral portion corresponding in position to the peripheral region of said display screen apparatus, said peripheral portion being formed with a plurality of pores therein,
   wherein said light cured material layer further has a middle portion corresponding to the viewing region of said display screen apparatus, said middle portion being light transmissive and extending from and being surrounded by said peripheral portion.

2. The display screen apparatus of claim 1, wherein said peripheral portion of said light cured material layer has a layer thickness ranging from 1-50 micrometers.

3. The display screen apparatus of claim 1, wherein the assembly of said peripheral portion of said light cured material layer and said light transmissive substrate has an optical density greater than 2 when measured at the peripheral region.

4. The display screen apparatus of claim 1, wherein said peripheral portion of said light cured material layer has a white color.

5. The display screen apparatus of claim 1, wherein said pores have a pore diameter ranging from 10-1000nm.

6. The display screen apparatus of claim 1, wherein said middle portion of said light cured material layer has a layer thickness ranging from 1-50 micrometers.

7. The display screen apparatus of claim 1, wherein said peripheral portion of said light cured material layer has a layer thickness greater than that of said middle portion of said light cured material layer by 5-20%.

8. The display screen apparatus of claim 1, wherein said middle portion of said light cured material layer has a light transmissibility greater than 90%.

9. The display screen apparatus of claim 1, further comprising a reflective layer formed on said peripheral portion of said light cured material layer.

10. The display screen apparatus of claim 9, wherein said reflective layer has a layer thickness less than 1 micrometer.

11. The display screen apparatus of claim 9, wherein said reflective layer is made from a metal having a reflectance greater than 60%.

12. The display screen apparatus of claim 9, wherein the assembly of said reflective layer, said peripheral portion of said light cured material layer and said light transmissive substrate has an optical density greater than 4 and a coordinate value (L, a, b) in the Lab color space, in which L>25, −1<a<1 and −1<b<1, when measured at the peripheral region.

13. A touch screen assembly comprising: a display screen apparatus as claimed in claim 1 and having an inner side; a touch sensing unit disposed on said inner side of said display screen apparatus and having an inner side; and a display panel disposed on said inner side of said touch sensing unit.

* * * * *